(12) United States Patent
Yokochi et al.

(10) Patent No.: US 10,300,853 B2
(45) Date of Patent: May 28, 2019

(54) SIGN DISPLAY APPARATUS AND METHOD FOR VEHICLE

(71) Applicant: HONDA MOTOR CO., LTD., Tokyo (JP)

(72) Inventors: Yuji Yokochi, Wako (JP); Izumi Takatsudo, Wako (JP); Shinnosuke Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 15/388,240

(22) Filed: Dec. 22, 2016

(65) Prior Publication Data

US 2017/0174132 A1    Jun. 22, 2017

(30) Foreign Application Priority Data

Dec. 22, 2015  (JP) .................. 2015-249324

(51) Int. Cl.
*B60K 35/00*    (2006.01)
*B60R 1/00*    (2006.01)
(Continued)

(52) U.S. Cl.
CPC ............... *B60R 1/00* (2013.01); *B60K 35/00* (2013.01); *B60K 37/02* (2013.01); *B60R 11/04* (2013.01); *G06K 9/00798* (2013.01); *G06K 9/00818* (2013.01); *G06K 9/78* (2013.01); *H04N 7/183* (2013.01); *B60K 2350/106* (2013.01); *B60K 2350/1064* (2013.01); *B60K 2350/1068* (2013.01); *B60K 2350/1076* (2013.01); *B60K 2350/1096* (2013.01); *B60K 2350/2013* (2013.01); *B60K 2350/2095* (2013.01); *B60K 2350/357* (2013.01); *B60K 2350/965* (2013.01); *B60R 2011/0026* (2013.01); *B60R 2300/103* (2013.01); *B60R 2300/107* (2013.01);
(Continued)

(58) Field of Classification Search
None
See application file for complete search history.

(56) References Cited

U.S. PATENT DOCUMENTS 6,472,977 B1 * 10/2002 Pochmuller ............ B60K 35/00
340/425.5
6,813,545 B2 * 11/2004 Stromme ........... G06K 9/00818
340/425.5
(Continued)

FOREIGN PATENT DOCUMENTS

JP    2009-110394 A    5/2009
JP    2010-266383 A    11/2010

OTHER PUBLICATIONS

Office Action dated Sep. 5, 2017, issued in counterpart Japanese Application No. 2015-249324, with English machine translation. (6 pages).

*Primary Examiner* — Christopher G Findley
(74) *Attorney, Agent, or Firm* — Westerman, Hattori, Daniels & Adrian, LLP

(57) ABSTRACT

Sign information of a traffic sign or a road marking ahead of a vehicle is detected. When two or more kinds of sign information having overlapping effective sections are detected or when the sign information contains textural information including a predetermined or more number of characters, simplified information obtained by simplifying the sign information is displayed on an MID in the vehicle.

8 Claims, 12 Drawing Sheets

(51) Int. Cl.
    *B60K 37/02*     (2006.01)
    *B60R 11/04*     (2006.01)
    *G06K 9/00*     (2006.01)
    *G06K 9/78*     (2006.01)
    *H04N 7/18*     (2006.01)
    *B60R 11/00*     (2006.01)

(52) U.S. Cl.
    CPC ... *B60R 2300/205* (2013.01); *B60R 2300/302* (2013.01); *B60R 2300/80* (2013.01); *B60Y 2400/92* (2013.01)

(56) References Cited

U.S. PATENT DOCUMENTS

| | | | |
|---|---|---|---|
| 9,697,430 B2* | 7/2017 | Kristensen | G06K 9/00818 |
| 2012/0046855 A1* | 2/2012 | Wey | G08G 1/09623 |
| | | | 701/117 |
| 2015/0206018 A1* | 7/2015 | Cho | G06K 9/00818 |
| | | | 382/161 |

* cited by examiner

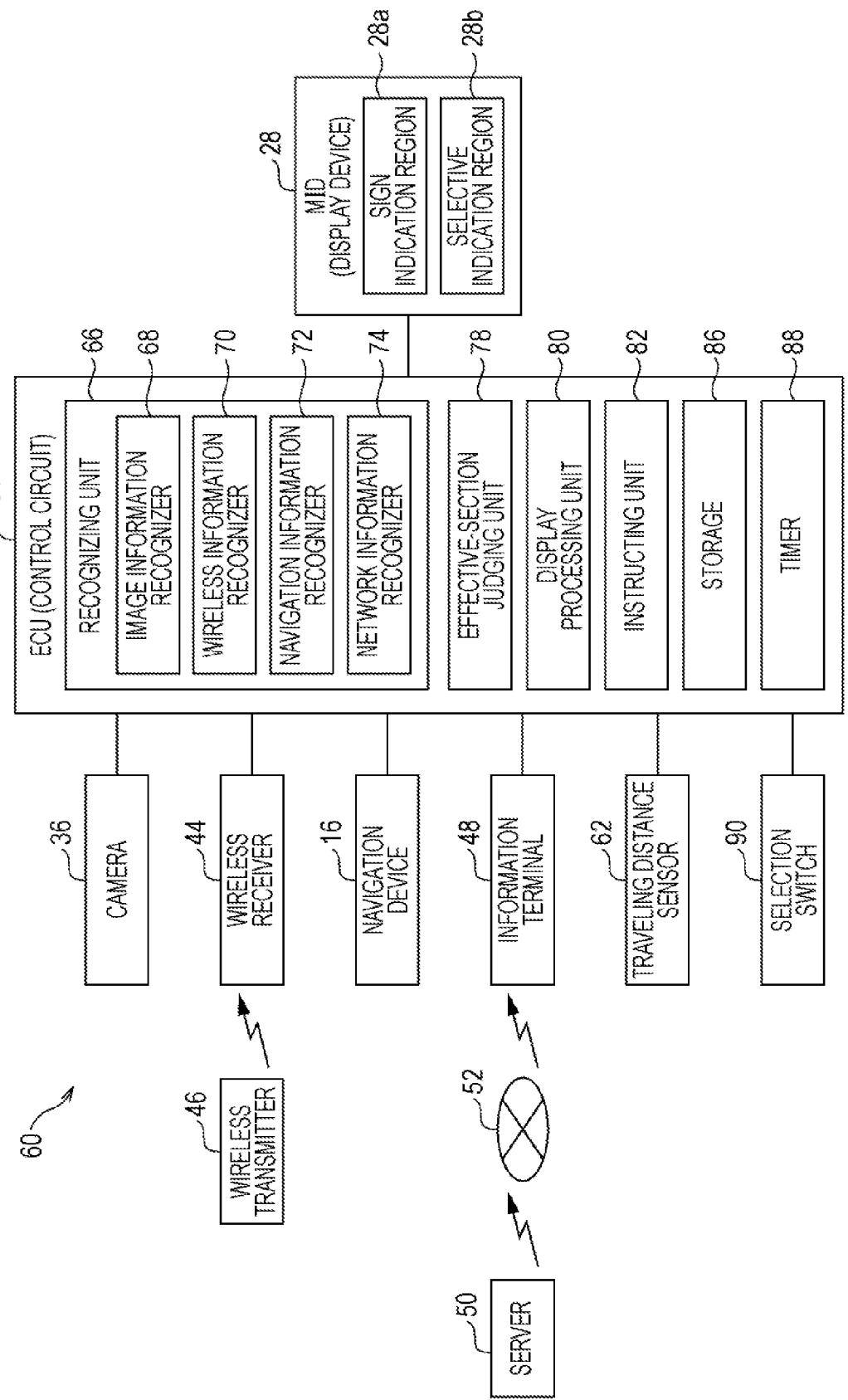

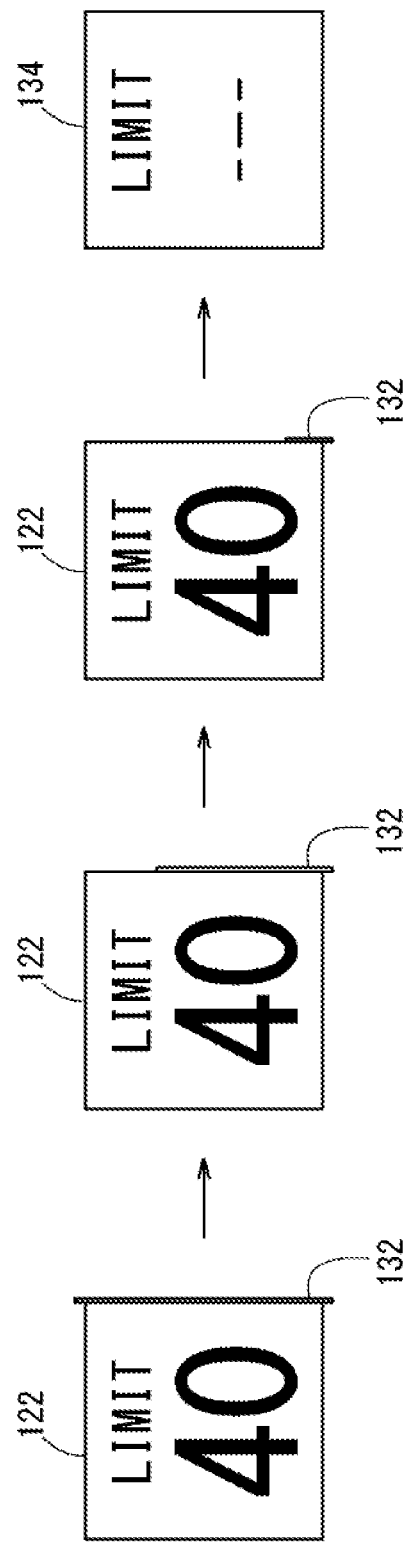

SIGN DISPLAY APPARATUS AND METHOD FOR VEHICLE

CROSS REFERENCES TO RELATED APPLICATIONS

The present application claims priority under 35 U.S.C. § 119 to Japanese Patent Application No. 2015-249324, filed Dec. 22, 2015, entitled "Sign Display Apparatus and Method for Vehicle." The contents of this application are incorporated herein by reference in their entirety.

BACKGROUND

1. Field

The present disclosure relates to a sign display apparatus for a vehicle and a sign display method for a vehicle for displaying sign information on a traffic sign or a road marking on a display unit in a vehicle.

2. Description of the Related Art

A vehicle in recent years is equipped with an apparatus that displays sign information on a display unit in the vehicle. The sign information is detected from a traffic sign image captured by a vehicle-mounted camera. Road-to-vehicle communication is sometimes performed between a wireless transmitter (a beacon, etc.) set along a road and a vehicle-mounted wireless receiver. In the case where the sign information is transmitted from the wireless transmitter, the vehicle is also able to detect the sign information by receiving the signal of the sign information with the wireless receiver. Further, the vehicle is also able to detect the sign information from map information of an apparatus (a car navigation apparatus, etc.) that detects the position of the vehicle.

Apparatuses that display sign information on display units have been described in various literatures. For example, Japanese Unexamined Patent Application Publication No. 2009-110394 describes an apparatus that displays, when two or more signs are detected in sign information, the signs in the sign information in predetermined order on a display device in a vehicle (Claim 1 and paragraphs [0021] and [0043]). U.S. Patent Application Publication No. 2012/0046855 describes an apparatus that displays sign information on a display device and thereafter makes the sign information gradually disappear on the basis of any one of a traveling distance, an elapsed time, and vehicle speed (paragraph [0023] and FIG. 3).

The apparatus described in Japanese Unexamined Patent Application Publication No. 2009-110394 displays two or more kinds of sign information, for example, sign information of a maximum speed sign, and sign information of a school, kindergarten, nursery school ahead sign side by side on the display device (FIG. 6 of Japanese Unexamined Patent Application Publication No. 2009-110394). The apparatus of U.S. Patent Application Publication No. 2012/0046855 also displays two or more kinds of sign information, for example, two kinds of sign information of two speed signs side by side on the display device (FIG. 5 of U.S. Patent Application Publication No. 2012/0046855).

In place of the display devices described in Japanese Unexamined Patent Application Publication No. 2009-110394 and U.S. Patent Application Publication No. 2012/0046855, display devices may be used such as a display in a meter, a head-up display (HUD), and a display of a car navigation device. Usually, various kinds of information are displayed on these displays besides the sign information. Therefore, when information other than the sign information is preferentially displayed, it is difficult to display two or more kinds of sign information or complicated sign information (sign information containing textural information including many characters, etc.) in size recognizable for an occupant.

SUMMARY

The present application describes a sign display apparatus for a vehicle and a sign display method for a vehicle for appropriately displaying two or more kinds of sign information and sign information including a predetermined or more number of characters to an occupant.

The present application describes a sign display apparatus for a vehicle including: a sign information detector that detects sign information of a traffic sign or a road marking ahead of a vehicle; a display device that displays the sign information detected by the sign information detector; and a control circuit that controls the display device. When the sign information detector detects two or more kinds of the sign information having overlapping effective sections or when the sign information detected by the sign information detector contains textural information including a predetermined or more number of characters, the display device displays, according to an instruction of the control circuit, simplified information obtained by simplifying the sign information detected by the sign information detector.

With this configuration, even when a plurality of kinds of sign information are detected or sign information including a predetermined or more number of characters is detected, it is possible to appropriately display content indicated by the sign information to an occupant in a limited indication region (a display region) of the display device.

In the present application, when the sign information detected by the sign information detector contains maximum speed information and the textural information or symbolic information other than the maximum speed information, the display device can also display the maximum speed information, and additionally display the simplified information containing the simplified textural information or symbolic information.

With this configuration, it is possible to appropriately display the maximum speed information and the textural information or the symbolic information other than the maximum speed information to the occupant in the limited indication region of the display device.

In the present application, the display device can also include a sign indication region in which the simplified information is displayed and a selective indication region which has a display area larger than a display area of the sign indication region and in which the sign information and other information different from the sign information are selectively displayed, and the display device can also display the simplified information in the sign indication region. Then, when the sign information is selected to be displayed in the selective indication region, the display device can display the sign information in the selective indication region such that the sign information contains an information amount larger than an information amount of the simplified information.

With this configuration, it is possible to adjust a detail level of the simplified information depending on the indication region. It is possible to appropriately display necessary information to the occupant. That is, the selective indication region has the display area larger than the display area of the sign indication region. Therefore, in the selective indication region, it is possible to display another version of the sign information closer to an actual sign than the simplified information displayed in the sign indication region. Consequently, the occupant can easily and intuitively recognize the display content.

In the present application, the display device can also hide the simplified information in the sign indication region while displaying the sign information in the selective indication region. Then, when a traveling distance of the vehicle or an elapsed time after the sign information starts to be displayed in the selective indication region becomes equal to or larger than a threshold, the display device can hide the sign information in the selective indication region and display the simplified information in the sign indication region.

With this configuration, when the sign information is displayed in the selective indication region, the occupant can easily recognize the information. As the traveling distance of the vehicle increases or time elapses, the indication region for displaying the sign information is shifted from the selective indication region to the sign indication region. Consequently, it is possible to enable the occupant to view the information when necessary while keeping the occupant from gazing the information more than necessary.

In the present application, when the sign information detector detects a plurality of kinds of the sign information having overlapping effective sections, the display device can also alternately display first simplified information and second simplified information while switching the first and second simplified information in predetermined time intervals, the first simplified information being the simplified information of at least one kind of the plurality of kinds of sign information to the simplified information, the second simplified information being the simplified information of another kind of the plurality of kinds of sign information.

When a plurality of kinds of sign information are displayed in the limited indication region, information that can be displayed is limited. With this configuration, it is possible to notify a plurality of kinds of simplified information even if there is only one indication part.

In the present application, the sign display apparatus for a vehicle can also include a plurality of types of the sign information detectors, and the display device can display the simplified information in a form that varies depending on the type of the sign information detector that detects the sign information.

With this configuration, it is possible to inform the occupant which sign information detector detects the information displayed. Therefore, when the simplified information displayed on the display device does not match the traffic sign actually installed on a traveling road, the occupant can recognize which sign information detector makes the mismatch. For example, the occupant can switch the sign information detector or recognize a failure.

In the present application, the display device can also display passage information beside the simplified information such that an indication amount of the passage information changes with an increase in a traveling distance of the vehicle or an elapsed time after the simplified information starts to be displayed. Then, when the indication amount of the passage information exceeds a predetermined amount, the display device can hide the simplified information.

With this configuration, it is possible to easily recognize freshness of displayed sign information.

The present application describes a sign display method for a vehicle including: detecting sign information of a traffic sign or a road marking ahead of a vehicle; and when a plurality of kinds of the sign information having overlapping effective sections are detected or when the sign information contains textural information including a predetermined or more number of characters, displaying simplified information obtained by simplifying the sign information on a display device of the vehicle.

With this configuration, even when a plurality of kinds of sign information are detected or sign information containing a predetermined or more number of characters is detected, it is possible to appropriately display content indicated by the sign information to an occupant in a limited indication region of the display device.

According to the present application, even when a plurality of kinds of sign information are detected or sign information containing a predetermined or more number of characters is detected, it is possible to appropriately display content indicated by the sign information to an occupant in a limited indication region of the display device.

BRIEF DESCRIPTION OF THE DRAWINGS

FIG. 2 is a block diagram of a sign display apparatus for a vehicle according to an embodiment.

FIG. 7 is a state explanatory diagram served for explanation of sign display processing 2.

DESCRIPTION OF THE PREFERRED EMBODIMENTS

A sign display apparatus for a vehicle and a sign display method for a vehicle according to preferred embodiments are explained in detail below with reference to the accompanying drawings.

1. Interior of a Vehicle 10

Figure 1A:
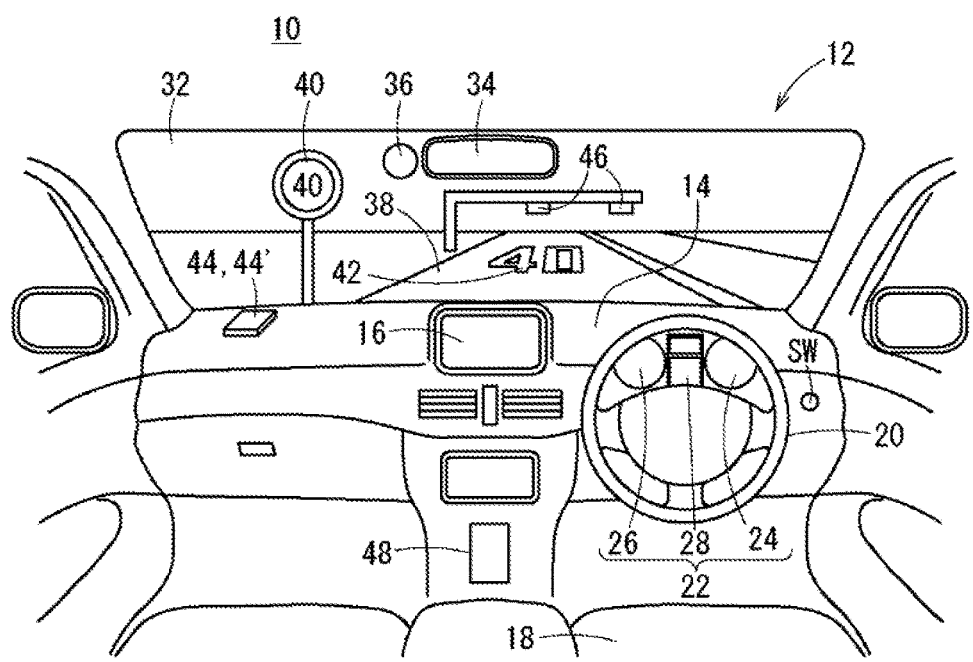
FIGS. 1A and 1B are simplified schematic views of an interior of a vehicle.
Figure 1B:
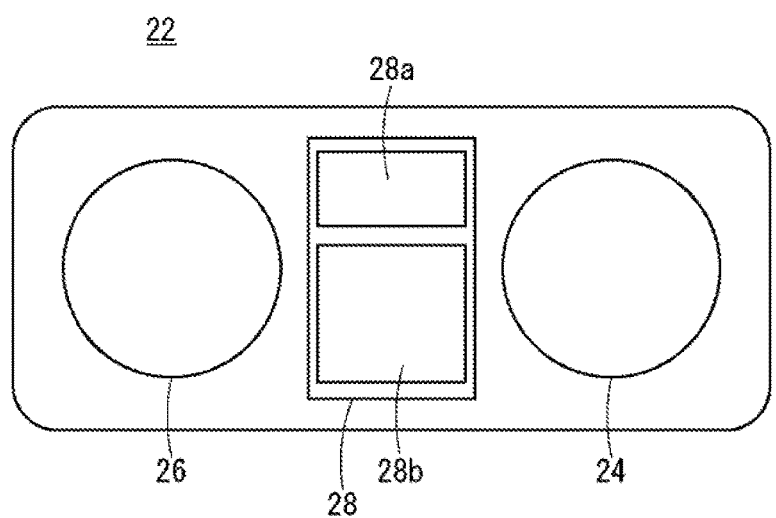

An interior of a vehicle 10 is explained with reference to FIGS. 1A and 1B. In FIGS. 1A and 1B, the interior of the vehicle 10 is depicted in a schematic view for simplification of explanation. In a vehicle interior 12 of the vehicle 10, a car navigation device 16, which stores map information, is provided substantially in the center in the vehicle width direction of a dashboard 14. A meter panel 22 is provided on the right side in the vehicle width direction of the dash board 14 and in the front of a driver's seat 18 and a steering wheel 20.

As shown in FIG. 1B, the meter panel 22 includes, for example, a speed meter 24 disposed on the right side, a tachometer 26 disposed on the left side, and a multi-information display (MID) 28 disposed in the center. The MID 28 is a display device that displays various kinds of information. The MID 28 includes a sign indication region 28*a* in an upper part and includes, in a lower part, a selective indication region 28*b* having a display area larger than a display area of the sign indication region 28*a*. In the sign indication region 28*a*, an image indicating simplified information obtained by simplifying sign information is displayed. In the selective indication region 28*b*, images indicating various kinds of information, for example, sign information and vehicle information (vehicle speed, a yaw rate, fuel efficiency, a traveling time, various traveling distances, a drivable distance, a traveling mode, etc.) are displayed. Display content of the selective indication region 28*b* can be switched according to operation of a changeover switch SW provided in the vehicle interior 12. Note that, as the display device, a display of the car navigation device 16 may be used, a HUD may be used, or a display of an information terminal 48 explained below may be used.

A camera 36 is provided on the inner side of a windshield 32 and near a rearview mirror 34. The camera 36 is attached to face the front of the vehicle 10. As the camera 36, various cameras (a monocular camera, a stereo camera, an infrared camera, etc.) can be used. The camera 36 captures images of the front of the vehicle 10 always or in predetermined time intervals, and also captures images of a traffic sign 40 and/or a road marking 42 indicating sign information at this point.

A wireless receiver 44 for performing road-to-vehicle communication is provided on the left side in the vehicle width direction of the dashboard 14. The wireless receiver 44 may be incorporated in the car navigation device 16. The wireless receiver 44 receives a signal transmitted from the outside of the vehicle 10. When the traveling road 38 is a main road (including an expressway), a plurality of wireless transmitters 46, for example, optical beacons that transmit traffic information (including sign information) with light and radio wave beacons that transmit traffic information (including sign information) with a radio wave are set along the traveling road 38. The wireless transmitters 46 are managed by a not-shown information managing unit. A sign information providing system is constructed by the information managing unit and the wireless transmitters 46. As such a system, there is, for example, a vehicle information and communication system (VICS) (registered trademark). When the wireless transmitters 46 are the optical beacons, a signal receiving area is several meters in front of or behind a part right under the beacon. When the wireless transmitters 46 are the radio wave beacons, a signal receiving area is several ten meters in front of or behind a part right under the beacon. The wireless receiver 44 receives signals of traffic information transmitted from the wireless transmitters 46 in the receiving area. Note that the sign display apparatus for a vehicle may include a wireless receiver 44' that performs vehicle-to-vehicle communication instead of or in addition to the road-to-vehicle communication.

The information terminal 48 is a smartphone, a tablet terminal, or the like installed with application software for car navigation. As shown in FIG. 2, the information terminal 48 is connected to a server 50 via a public line 52 and stores the latest map information downloaded from the server 50.

2. Configuration of a Sign Display Apparatus for a Vehicle 60

The configuration of a sign display apparatus for a vehicle 60 according to the this embodiment is explained with reference to FIG. 2. The sign display apparatus for a vehicle 60 includes sign information detectors (16, 36, 44, and 48), an ECU 64 that performs display control of sign information on the basis of information output from the sign information detectors (16, 36, 44, and 48), and the MID 28 that displays sign information according to an instruction output from the ECU 64. The sign information detectors (16, 36, and 44) excluding the information terminal 48, the ECU 64, and the MID 28 are a part of components of a vehicle-mounted network and are capable of communicating with one another via the network. The information terminal 48 is connected to an interface of the vehicle-mounted network by wire or by radio.

The car navigation device 16, the camera 36, the wireless receiver 44, and the information terminal 48 detect sign information and output signals including the sign information to the ECU 64. A traveling distance sensor 62 detects a traveling distance of the vehicle 10.

The ECU 64 is a control circuit that controls the display device (the MID 28) on the basis of sign information. The ECU 64 is a computer including a microcomputer and includes a CPU (central processing unit), a ROM (including an EEPROM), a RAM (random access memory), and input and output devices such as an A/D converter and a D/A converter. The CPU reads out and executes computer programs recorded in the ROM, whereby the ECU 64 functions as various function realizing units. In this embodiment, the ECU 64 executes the computer programs to thereby function as a recognizing unit 66, an effective-section judging unit 78, a display processing unit 80, and an instructing unit 82. The ECU 64 includes a storage 86 and a timer 88. The ECU 64 may be divided into a plurality of units or may be integrated with other ECUs. Note that the ECU 64 can also be realized by other hardware.

The recognizing unit 66 is configured to recognize sign information from an input signal. The recognizing unit 66 includes an image information recognizer 68, a wireless information recognizer 70, a navigation information recognizer 72, and a network information recognizer 74.

The image information recognizer 68 is configured to process an image ahead of the vehicle 10 captured by the camera 36 and recognize sign information indicated by the traffic sign 40 and the road marking 42. The image information recognizer 68 is capable of performing publicly-known traffic sign recognition processing such as pattern matching. For example, the image information recognizer 68 is configured to recognize signs (the traffic sign 40 and the road marking 42) out of the image ahead of the vehicle 10 captured by the camera 36, remove noise of recognized images (images of the traffic sign 40 and the road marking 42), and recognize a type of the sign information.

The wireless information recognizer 70 is configured to recognize sign information and effective section information indicating an effective section of the sign information from a signal received by the wireless receiver 44. The wireless transmitters 46 transmit various kinds of traffic information. The wireless information recognizer 70 recognizes the sign information and the effective sign information out of the traffic information.

The navigation information recognizer 72 is configured to recognize sign information and effective section information included in map information around the vehicle 10 detected by the navigation device 16. Similarly, the network information recognizer 74 is configured to recognize sign information and effective section information included in map information around the vehicle 10 detected by the information terminal 48.

The effective-section judging unit 78 is configured to judge whether the vehicle 10 is traveling in an effective section of sign information detected by the recognizing unit 66. For example, the traffic sign 40 (see FIG. 1A) set on the traveling road 38 is added with auxiliary sign indicating an effective section of the traffic sign 40. The effective-section judging unit 78 judges based on information on the auxiliary sign recognized by the image information recognizer 68 whether the vehicle 10 is traveling in the effective section of the sign information indicated by the traffic sign 40. Concerning the traffic sign 40 not added with the auxiliary information, the effective-section judging unit 78 judges based on a fixed distance starting from the traffic sign 40 and a traveling distance detected by the traveling distance sensor 62 whether the vehicle 10 is traveling in the effective section of the sign information. The effective section judging unit 78 judges whether the vehicle 10 is traveling in the effective section of sign information based on effective section information recognized by the wireless information recognizer 70 and the traveling distance detected by the traveling distance sensor 62. The effective section judging unit 78 judges based on effective section information recognized by the navigation information recognizer 72 or the network information recognizer 74 whether the vehicle 10 is traveling in the effective section of the sign information.

The display processing unit 80 is configured to perform processing concerning display of the MID 28. Specifically, the display processing unit 80 changes sign information recognized by the recognizing unit 66 to simplified information. The simplified information is simplified sign information. Simplification in this specification means reducing the number of characters of the sign information or converting a mark of the sign information into characters. A display area of the simplified information is smaller than a display area of the sign information. The display processing unit 80 determines, according to an information source of the sign information, a display mode of the simplified information, for example, a display color, an image shape, and a symbol to be added. In this embodiment, the information source is an image of the traffic sign 40 or the road marking 42 captured by the camera 36, traffic information received by the wireless receiver 44, map information stored by the car navigation device 16, and map information stored by the information terminal 48. The display processing unit 80 determines in which of the sign indication region 28a and the selective indication region 28b of the MID 28 the simplified information should be displayed. The instructing unit 82 is configured to receive a processing result of the display processing unit 80 and output a display instruction to the MID 28.

The storage 86 stores the sign information and the simplified information in association with each other. The timer 88 measures various times.

Note that the ECU 64 is capable of selecting, according to a signal output from the selection switch 90, a sign information detector (the camera 36, the wireless receiver 44, the car navigation device 16, or the information terminal 48) to be used. The selection switch 90 is operated by the occupant as appropriate.

3. Sign Display Processing

Basic processing (sign display processing 1) and additional processing (sign display processing 2 to 4) performed in the sign display apparatus for a vehicle 60 are explained below.

[3-1. Sign Display Processing 1]

Various regulations, warnings, and the like are set on the traveling road 38. For example, one or a plurality of traffic signs 40 or road markings 42 are set on the traveling road 38. One or more kinds of sign information are transmitted from the wireless transmitters 46. The sign display apparatus for a vehicle 60 detects sign information indicating one or a plurality of regulations, warnings, and the like set on the traveling road 38, simplifies the sign information, and displays the sign information on the display device. In the following explanation, processing executed in the sign display apparatus for a vehicle 60 is explained with reference to FIG. 3. Note that a series of processing explained below may be periodically performed or may be performed at predetermined timing, for example, timing when sign information is detected.

In step S1, sign information is detected. The camera 36 images the front of the vehicle 10 at a predetermined time interval. An image captured by the camera 36 is captured into the image information recognizer 68. The image information recognizer 68 performs a series of sign recognition processing. At this point, when images of the traffic signs 40 and the road markings 42 are included, the image information recognizer 68 recognizes sign information indicated by all of the traffic signs 40 and the road markings 42 included in the images. When the vehicle 10 is located in a reception area of signals transmitted by the wireless transmitters 46, the wireless receiver 44 receives the signals transmitted from the wireless transmitters 46. The wireless information recognizer 70 recognizes the sign information from the signal received by the wireless receiver 44. The car navigation device 16 measures the position of the vehicle 10. The navigation information recognizer 72 recognizes sign information of the position of the vehicle 10 from the map information of the car navigation device 16. The information terminal 48 measures the position of the vehicle 10. The network information recognizer 74 recognizes the sign information of the position of the vehicle 10 from the map information of the information terminal 48.

In step S2, it is judged whether maximum speed information is present. The maximum speed information is sign information indicating maximum speed of the traveling road 38. It is judged whether maximum speed information effective at that point in time is present in the latest sign information detected in step S1 and sign information detected in the previous processing. When the effective maximum speed information is present (YES in step S2), the processing shifts to processing in step S3. On the other hand, when the effective maximum speed information is absent (NO in step S2), the processing shifts to processing in step S8.

Note that, when kinds of maximum speed information of a plurality of information sources are effective, it is possible to select any kind of maximum speed information. For example, it is possible to set priority order of the information sources in advance and select the maximum speed information detected from the information source having high priority order. It is also possible to change the priority order according to a situation.

In step S3, it is judged whether symbolic information is present in the sign information. The symbolic information is sign information such as a regulation, a warning, or the like indicated by a visual mark (a pictograph). It is judged whether symbolic information effective at that point in time is present in the latest sign information detected in step S1 and the sign information detected in the previous processing. When the effective symbolic information is present (YES in step S3), the processing shifts to processing in step S5. On the other hand when the effective sign information is absent (NO in step S3), the processing shifts to processing in step S4.

In step S4, it is judged whether textural information including a predetermined or more number of characters is present in the sign information. The textural information is sign information indicating content of a regulation using characters and is sign information incidental to the maximum speed information. When the textural information including the predetermined or more number of characters is present (YES in step S4), the processing shifts to processing in step S5. On the other hand, when the textural information including the predetermined or more number of characters is absent (NO in step S4), processing shifts to processing in step S8.

In step S5, the sign information is changed to simplified information. The display processing unit 80 changes the sign information recognized by the recognizing unit 66 to simplified information that should be displayed on the MID 28. The processing performed in step S5 is explained with reference to specific examples shown in FIGS. 4A to 4C and FIGS. 5A and 5B.

Figure 4A:
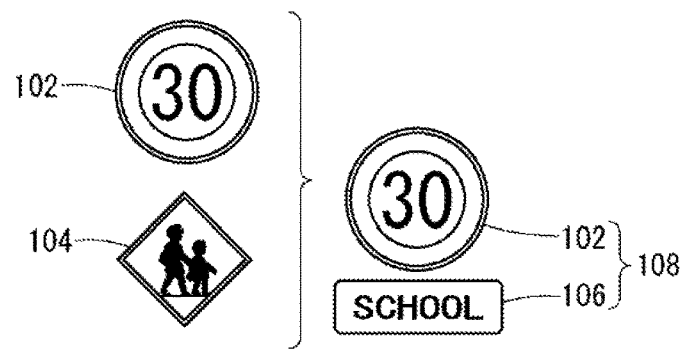
FIGS. 4A to 4C are explanatory diagrams served for explanation of simplification of sign information.
Figure 4B:
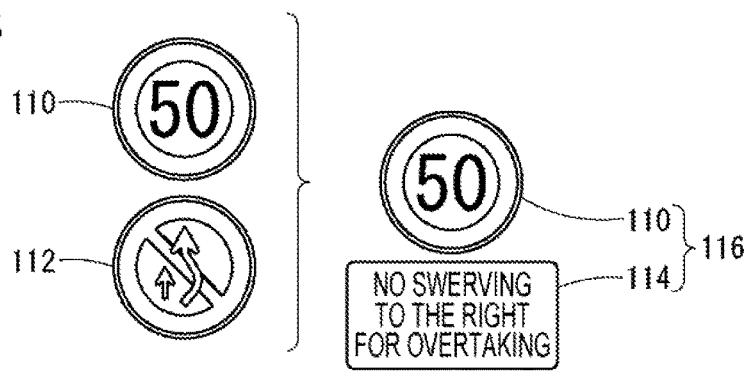
Figure 4C:
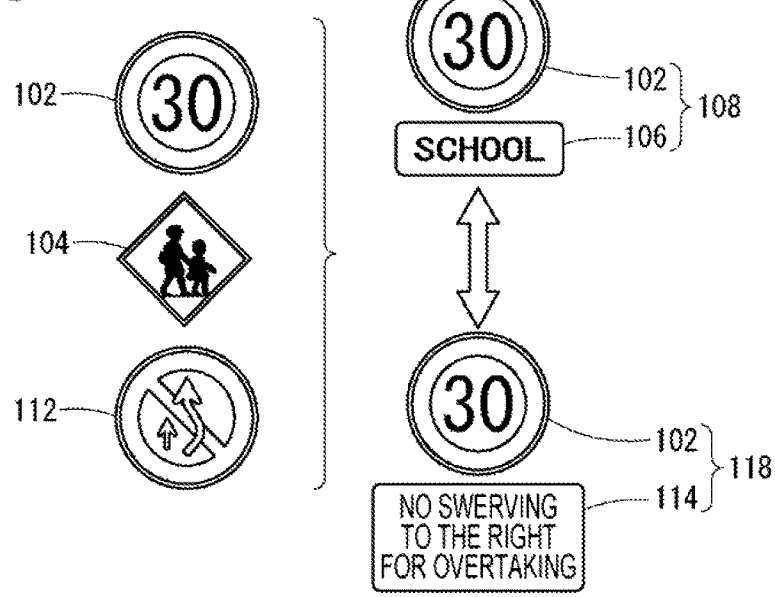

First, processing performed when symbolic information is present other than maximum speed information is explained with reference to FIGS. 4A to 4C. FIGS. 4A to 4C show traffic signs in Japan. As shown in FIG. 4A, for example, images of two traffic signs 102 and 104 are captured by the camera 36. The traffic sign 102 is maximum speed information indicating a regulation of maximum speed of "30 km/h". The traffic sign 104 is symbolic information indicating a warning "there is a school, kindergarten, or nursery school ahead". In the storage 86, simplified information indicating a simplified sign 106 is stored in advance. The simplified sign 106 is a sign obtained by simplifying the traffic sign 104 (converting the traffic sign 104 into characters). In this case, the display processing unit 80 changes sign information indicating the two traffic signs 102 and 104 to simplified information indicating a simplified sign 108 including the traffic sign 102 and the simplified sign 106.

As shown in FIG. 4B, for example, images of two traffic signs 110 and 112 are captured by the camera 36. The traffic sign 110 is maximum speed information indicating a regulation of maximum speed of "50 km/h". The traffic sign 112 is symbolic information indicating a regulation "no swerving to the right for overtaking". In storage 86, simplified information indicating a simplified sign 114 is stored in advance. The simplified sign 114 is a sign obtained by simplifying the traffic sign 112 (converting the traffic sign 112 into characters). In this case, the display processing unit 80 changes sign information indicating the two traffic signs 110 and 112 to simplified information indicating a simplified sign 116 including the traffic sign 110 and the simplified sign 114.

As shown in FIG. 4C, for example, images of three traffic signs 102, 104, and 112 are captured by the camera 36. In this case, the display processing unit 80 changes sign information indicating the three traffic signs 102, 104, and 112 to simplified information indicating the simplified sign 108 including the traffic sign 102 and the simplified sign 106 and simplified information indicating a simplified sign 118 including the traffic sign 102 and the simplified sign 114.

Figure 5A:
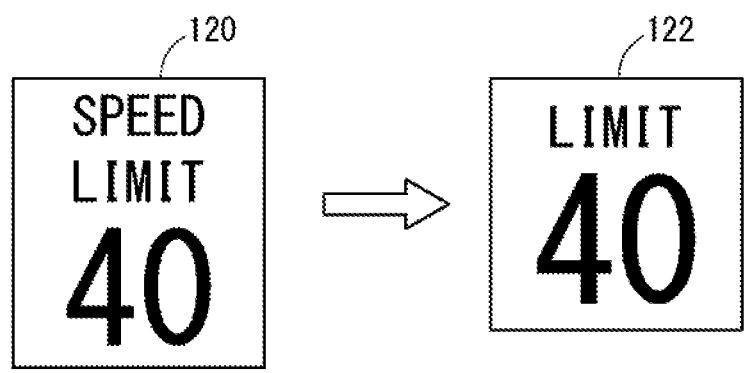
FIGS. 5A and 5B are explanatory diagrams served for explanation of simplification of sign information.
Figure 5B:
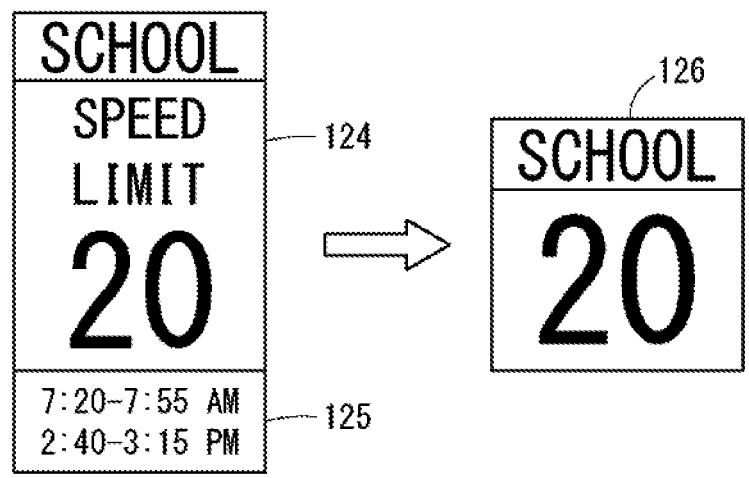

Processing performed when textural information including a predetermined or more number of characters is present in addition to maximum speed information is explained with reference to FIGS. 5A and 5B. FIGS. 5A and 5B show traffic signs in the United States. As shown in FIG. 5A, for example, an image of a traffic sign 120 is captured by the camera 36. The traffic sign 120 is maximum speed information indicating a regulation of maximum speed of "40 mph". Textural information including ten characters "SPEED LIMIT" is included in the traffic sign 120. In the storage 86, simplified information indicating a simplified sign 122 is stored in advance. The simplified sign 122 is a sign obtained by simplifying the textural information included in the traffic sign 120. In this case, the display processing unit 80 changes the sign information indicating the traffic sign 120 to simplified information indicating the simplified sign 122.

As shown in FIG. 5B, for example, an image of a traffic sign 124 and an auxiliary sign 125 is captured by the camera 36. The traffic sign 124 is maximum speed information indicating a regulation of maximum speed of "20 mph". Textural information including sixteen characters "SCHOOL", "SPEED LIMIT" is included in the traffic sign 124. Textural information including twenty-two characters "7:20-7:55 AM" and "2:40-3:15 PM" is included in the auxiliary sign 125. In the storage 86, simplified information indicating a simplified sign 126 is stored in advance. The simplified sign 126 is a sign obtained by simplifying the textural information included in the traffic sign 124 and the auxiliary sign 125. In this case, the display processing unit 80 changes the sign information indicating the traffic sign 124 to simplified information indicating the simplified sign 126.

In step S6, a display mode is judged. In this embodiment, information sources are the image of the traffic sign 40 or the road marking 42 captured by the camera 36, traffic information received by the wireless receiver 44, the map information stored by the car navigation device 16, and the map information stored by the information terminal 48. The display processing unit 80 judges an information source of maximum speed information and judges a display mode, that is, a display color corresponding to the information source. It is also possible to judge, instead of the display color, a display shape or a symbol to be added.

Figure 6A:
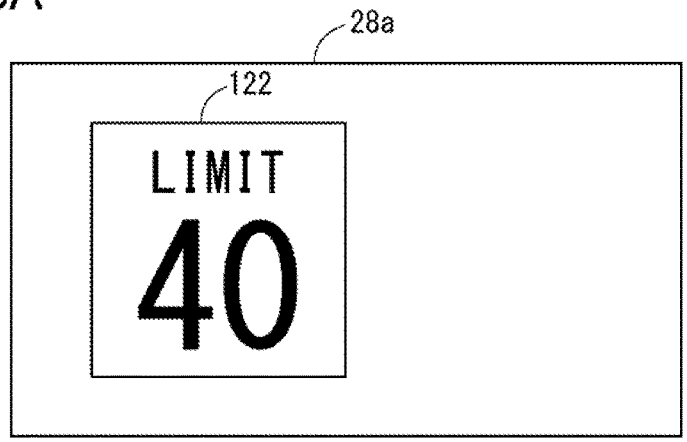
FIGS. 6A to 6C are explanatory diagrams served for explanation of a display state.
Figure 6B:
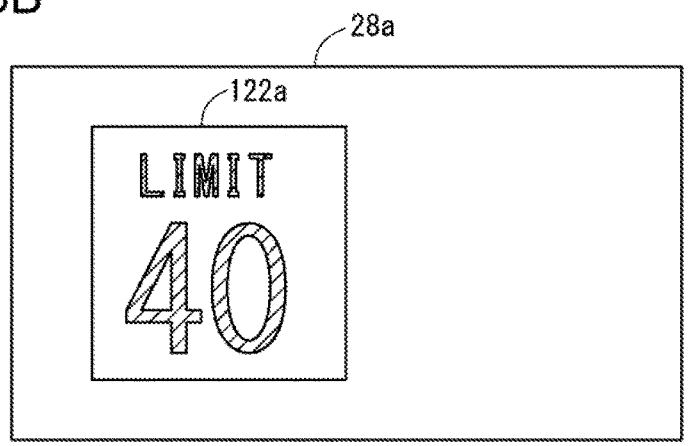
Figure 6C:
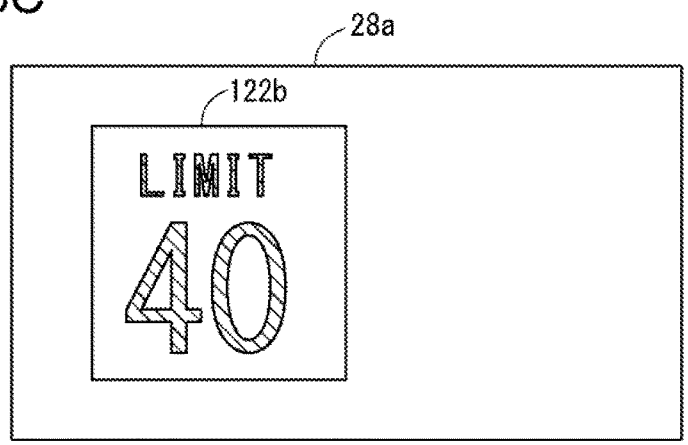

In step S7, the simplified information is displayed. The instructing unit 82 receives a processing result of the display processing unit 80 and outputs a display instruction for the simplified information to the MID 28. The MID 28 displays the simplified information according to the instruction of the instructing unit 82. For example, when the image of the traffic sign 120 (see FIG. 5A) is captured by the camera 36, as shown in FIG. 6A, the MID 28 displays the simplified sign 122 having a first color in the sign indication region 28*a* as the simplified information. When sign information indicating the traffic sign 120 (see FIG. 5A) is received by the wireless receiver 44, as shown in FIG. 6B, the MID 28 displays a simplified sign 122*a* having a second color in the sign indication region 28*a* as the simplified information. When sign information indicating the traffic sign 120 (see FIG. 5A) is detected from the map information stored by the car navigation device 16 or the information terminal 48, as shown in FIG. 6C, the MID 28 display a simplified sign 122*b* having a third color in the sign indication region 28*a* as the simplified information. Note that the length in the longitudinal direction and the length in the lateral direction of the simplified signs 122, 122*a*, and 122*b* are desirably equal. The simplified signs 122, 122*a*, and 122*b* are desirably, for example, a square or a circle.

When the maximum speed information is absent in step S2 (NO in step S2) or when the symbolic information is absent in step S3 (NO in step S3) and the textural information including the predetermined or more number of characters is absent in step S4 (NO in step S4), processing in step S8 is performed. In step S8, sign information is displayed. Since sign information to be simplified is absent, the MID 28 displays a normal traffic sign (e.g., the traffic sign 102 shown in FIG. 4A) in the sign indication region 28a as the sign information.

[3-2. Sign Display Processing 2]

It is also possible to perform processing explained below when the sign display processing 1 explained in 3-1 is performed. For example, as shown in FIG. 5A, when sign information indicating the traffic sign 120 is detected, the MID 28 displays the simplified sign 122 in the sign indication region 28a (see FIG. 1B). In this case, as shown in FIG. 7, a bar 132 may be displayed beside the simplified sign 122. The bar 132 is passage information visually showing an elapsed time or a traveling distance of the vehicle 10 starting from a point in time when the simplified sign 122 is displayed. In FIG. 7, time elapses from the left to the right. An indication amount of the bar 132 decreases over time. When a predetermined time elapses, the bar 132 is hidden and the simplified sign 122 is changed to a simplified sign 134.

Like the display processing for the simplified sign 122, display processing for the bar 132 is also performed mainly by the display processing unit 80. Processing executed in the sign display apparatus for a vehicle 60 is explained with reference to FIG. 8. Processing performed when time elapse is indicated by the bar 132 is explained.

During the start of the processing, the MID 28 displays the simplified sign 122 and the bar 132 in the sign indication region 28a. At this point, in step S11, the timer 88 is reset. In step S12, clocking by the timer 88 is started. In step S13, it is judged whether time of the timer 88 has exceeded a predetermined time. When the time has not exceeded the predetermined time (NO in step S13), the processing shifts to processing in step S14. In step S14, the MID 28 reduces the indication amount of the bar 132. The processing returns to step S13. On the other hand, when the time has exceeded the predetermined time in step S13 (YES in step S13), the processing shifts to processing in step S15. In step S15, the MID 28 hides the bar 132 and changes the simplified sign 122 to the simplified sign 134.

Figure 8:
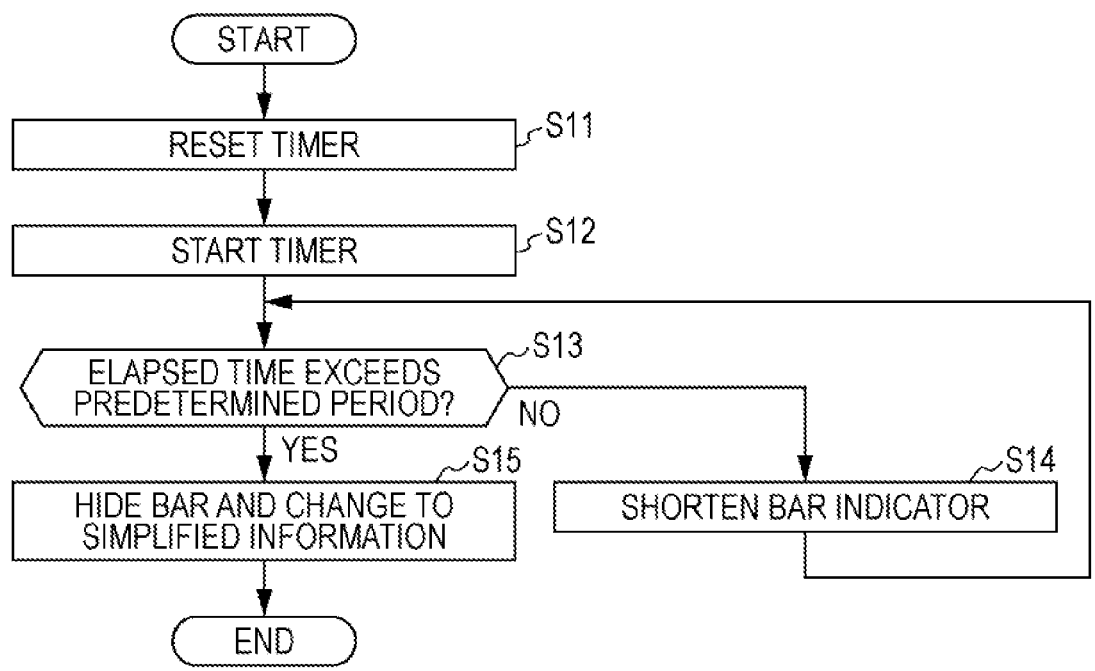
FIG. 8 is a flowchart of the sign display processing 2.

In the processing shown in FIG. 8, the elapsed time is used as the passage information. However, it is also possible to use a traveling distance as the passage information. The traveling distance can be measured by the traveling distance sensor 62 (see FIG. 2).

In the form explained above, the indication amount of the bar 132 decreases as the elapsed time or the traveling distance of the vehicle 10 increases. However, the indication amount of the bar 132 may increase as the elapsed time or the traveling distance of the vehicle 10 increases. The elapsed time and the traveling distance of the vehicle 10 may be indicated by the luminance of display rather than the bar 132.

[3-3. Sign Display Processing 3]

Figure 9A:
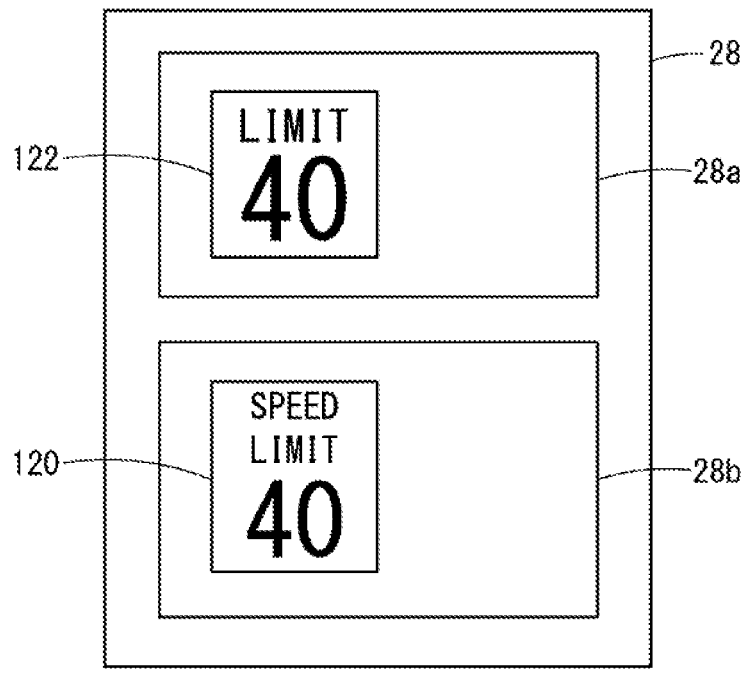
FIGS. 9A and 9B are explanatory diagrams served for explanation of sign display processing 3.
Figure 9B:
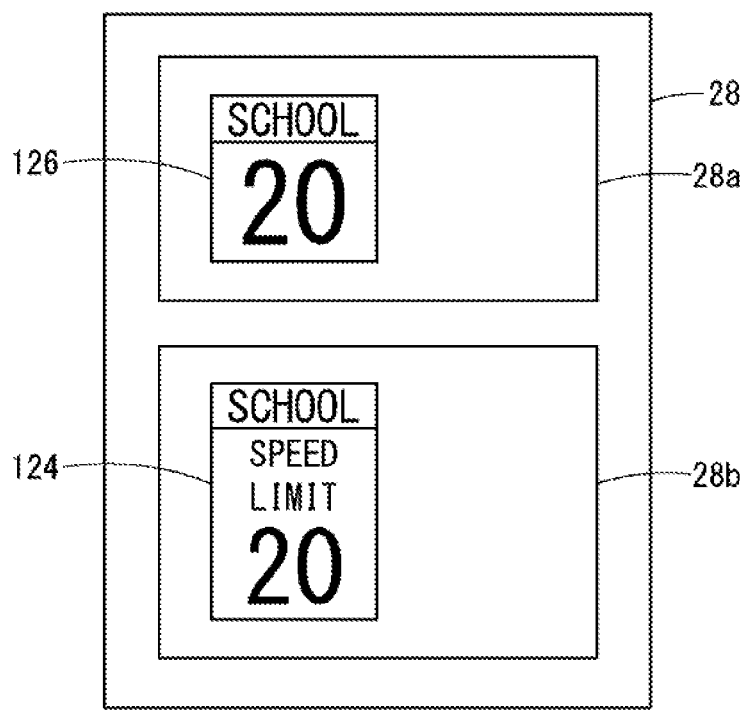

It is also possible to perform processing explained below when the sign display processing 1 explained in 3-1 is performed. The occupant can select sign information as a display object in the selective indication region 28b by operating the changeover switch SW (see FIG. 1A) in the vehicle interior 12. In this case, the MID 28 is capable of displaying simplified information in the sign indication region 28a and display simplified information or sign information containing a large information amount in the selective indication region 28b. For example, as shown in FIG. 9A, the MID 28 displays the simplified sign 122 in the sign indication region 28a as the simplified information and displays the traffic sign 120 in the selective indication region 28b as the sign information. As shown in FIG. 9B, the MID 28 displays the simplified sign 126 in the sign indication region 28a as the simplified information and displays the traffic sign 124 in the selective indication region 28b as the sign information. The traffic sign 124 contains a larger information amount by characters "SPEED LIMIT" than the simplified sign 126. Note that the MID 28 is also capable of displaying another simplified sign containing an information amount larger than the information amount of the simplified sign 126 in the selective indication region 28b.

Figure 10A:
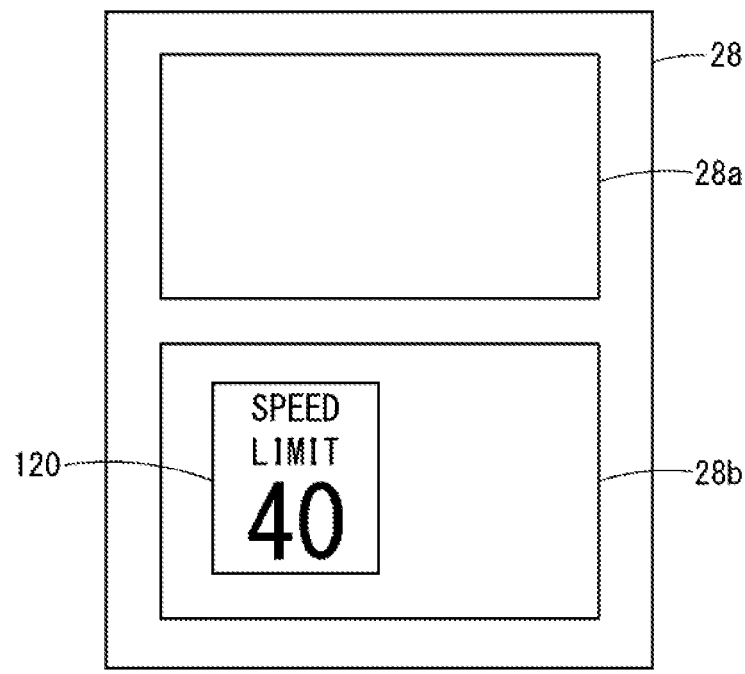
FIGS. 10A and 10B are explanatory diagrams served for explanation of the sign display processing 3.
Figure 10B:
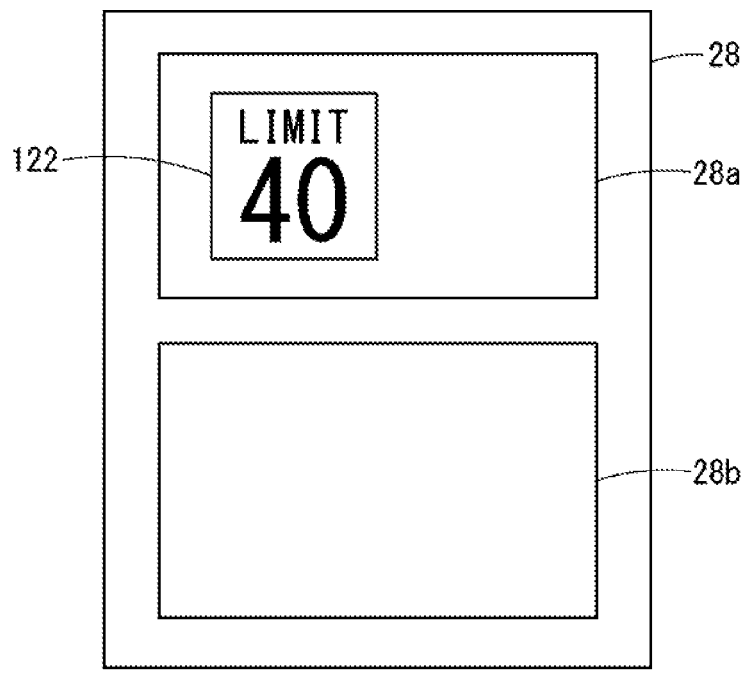

As shown in FIGS. 10A and 10B, the MID 28 is also capable of hiding the sign indication region 28a and displaying the traffic sign 120 in the selective indication region 28b as the sign information first and, after a predetermined time, displaying the simplified sign 122 in the sign indication region 28a as the simplified information and hiding the selective indication region 28b.

Figure 11:
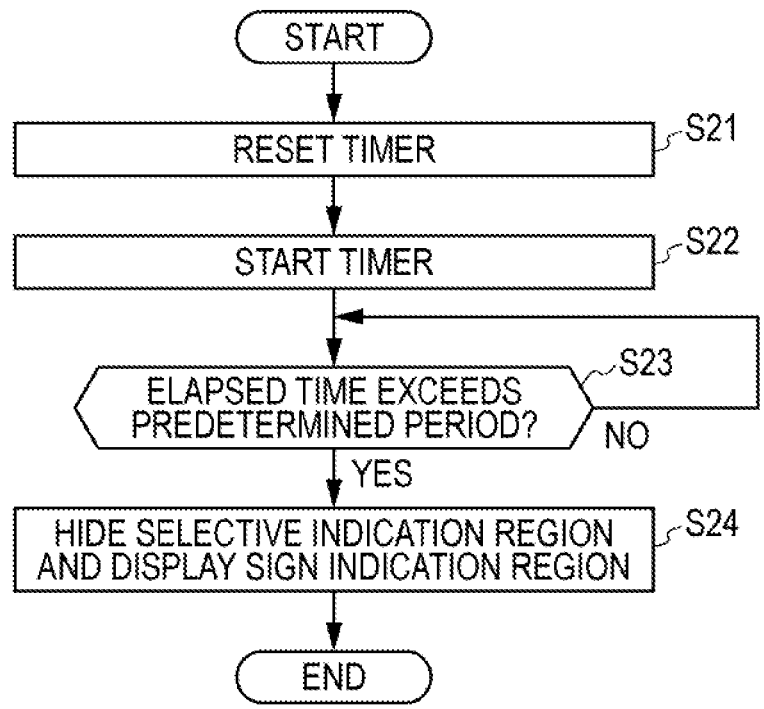
FIG. 11 is a flowchart of the sign display processing 3.

Processing executed in the sign display apparatus for a vehicle 60 is explained with reference to FIG. 11. During the start of the processing, as shown in FIG. 10A, the MID 28 hides the sign indication region 28a and displays the traffic sign 120 in the selective indication region 28b as the sign information. At this point, in step S21, the timer 88 is reset. In step S22, clocking by the timer 88 is started. In step S23, it is judged whether time of the timer 88 has exceeded a predetermined time. If the time has not exceeded the predetermined time (NO in step S23), the clocking by the timer 88 is continued and the processing in step S23 is repeated. On the other hand, if the time has exceeded the predetermined time in step S23 (YES in step S23), the processing shifts to processing in step S24. In step S24, as shown in FIG. 10B, the MID 28 displays the simplified sign 122 in the sign indication region 28a as the simplified information and hides the selective indication region 28b.

[3-4. Sign Display Processing 4]

Figure 12:
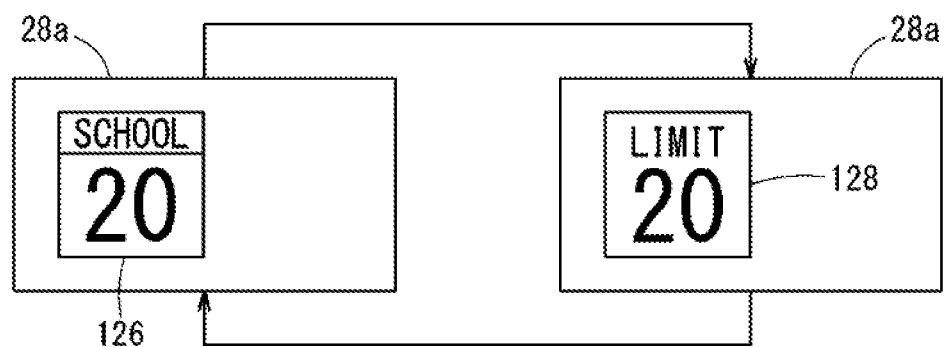
FIG. 12 is an explanatory diagram served for explanation of sign display processing 4.

It is also possible to perform processing explained bellow after the sign display processing 1 explained in 3-1. When sign information is simplified, information is sometimes omitted. For example, in the simplified sign 126 shown in FIG. 5B, textural information including characters "SPEED LIMIT" in textural information including characters "SCHOOL" and characters "SPEED LIMIT" included in the traffic sign 124 is omitted. Further, textural information indicating a regulation time is omitted. When the sign information is simplified, it is desirable to increase an information amount as much as possible. From such a viewpoint, it is also possible to alternately display two or more kinds of simplified information. For example, as shown in FIG. 12, the MID 28 is also capable of alternately displaying, in the sign indication region 28a, the simplified sign 126 obtained by simplifying the traffic sign 124 and a simplified sign 128 obtained by simplifying the traffic sign 124.

Figure 13:
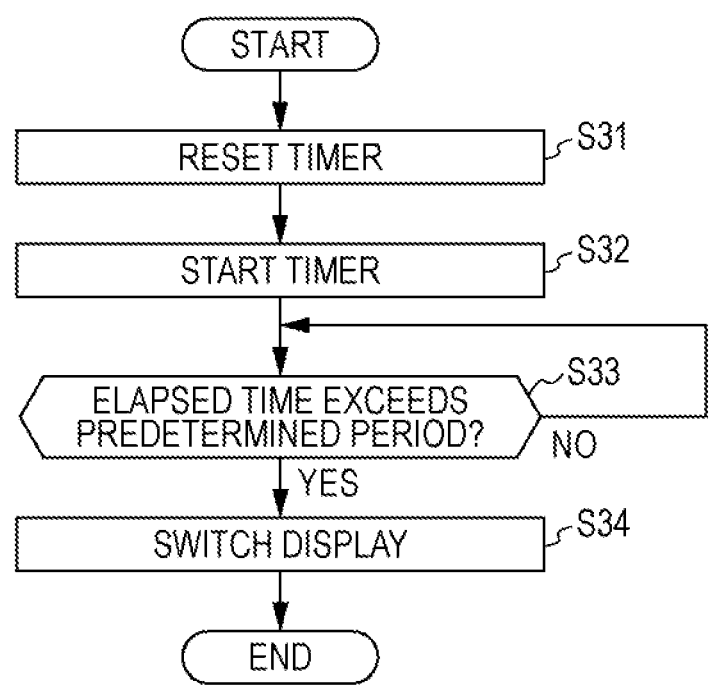
FIG. 13 is a flowchart of the sign display processing 4.

Processing executed in the sign display apparatus for a vehicle 60 is explained with reference to FIG. 13. During the start of the processing, the MID 28 displays the simplified sign 126 in the sign indication region 28a. At this point, in step S31, the timer 88 is reset. In step S32, clocking by the timer 88 is started. In step S33, it is judged whether time of the timer 88 has exceeded a predetermined time. If the time has not exceeded the predetermined time (NO in step S33), the clocking by the timer 88 is continued and the processing in step S33 is repeated. On the other hand, if the time has exceeded the predetermined time in step S33 (YES in step S33), the processing shifts to processing in step S34. In step S34, the MID 28 switches the display. As shown in FIG. 12, the MID 28 switches the display of the sign indication region 28a from the simplified sign 126 to the simplified sign 128. The processing returns to the processing in step S31.

Note that the simplified sign 108 and the simplified sign 118 shown in FIG. 4C are alternately displayed in the same manner.

4. Summary of this Embodiment

The sign display apparatus for a vehicle 60 according to this embodiment includes the camera 36 that detects sign information on the traffic sign 40 or the road marking 42 ahead of the vehicle 10, the wireless receiver 44, the car navigation device 16, the sign information detectors (hereinafter referred to as sign information detectors 16, 36, 44, and 48) such as the information terminal 48, the MID 28 (the display device) that displays the sign information detected by the sign information detectors 16, 36, 44, and 48, and the ECU 64 (the control circuit) that controls the MID 28. When two or more kinds of sign information having overlapping effective sections are detected by the sign information detectors 16, 36, 44, and 48 or when textural information including a predetermined or more number of characters is included in the sign information detected by the sign information detectors 16, 36, 44, and 48, the MID 28 displays, according to an instruction of the ECU 64, simplified information obtained by simplifying the sign information detected by the sign information detectors 16, 36, 44, and 48.

That is, when the plurality of kinds of sign information having the overlapping effective sections are detected by the sign information detectors 16, 36, 44, and 48 or when the textural information including the predetermined or more number of characters is contained in the sign information detected by the sign information detectors 16, 36, 44, and 48, the display processing unit 80 of the ECU 64 changes the sign information detected by the sign information detectors 16, 36, 44, and 48 to simplified information obtained by simplifying the sign information. The instructing unit 82 receives a judgment result of the display processing unit 80 and outputs a display instruction to the MID 28.

According to this embodiment, even when the plurality of kinds of sign information or the sign information including the predetermined or more number of characters is detected, it is possible to appropriately display content indicated by the sign information to the occupant in a limited indication region of the MID 28.

Figure 3:
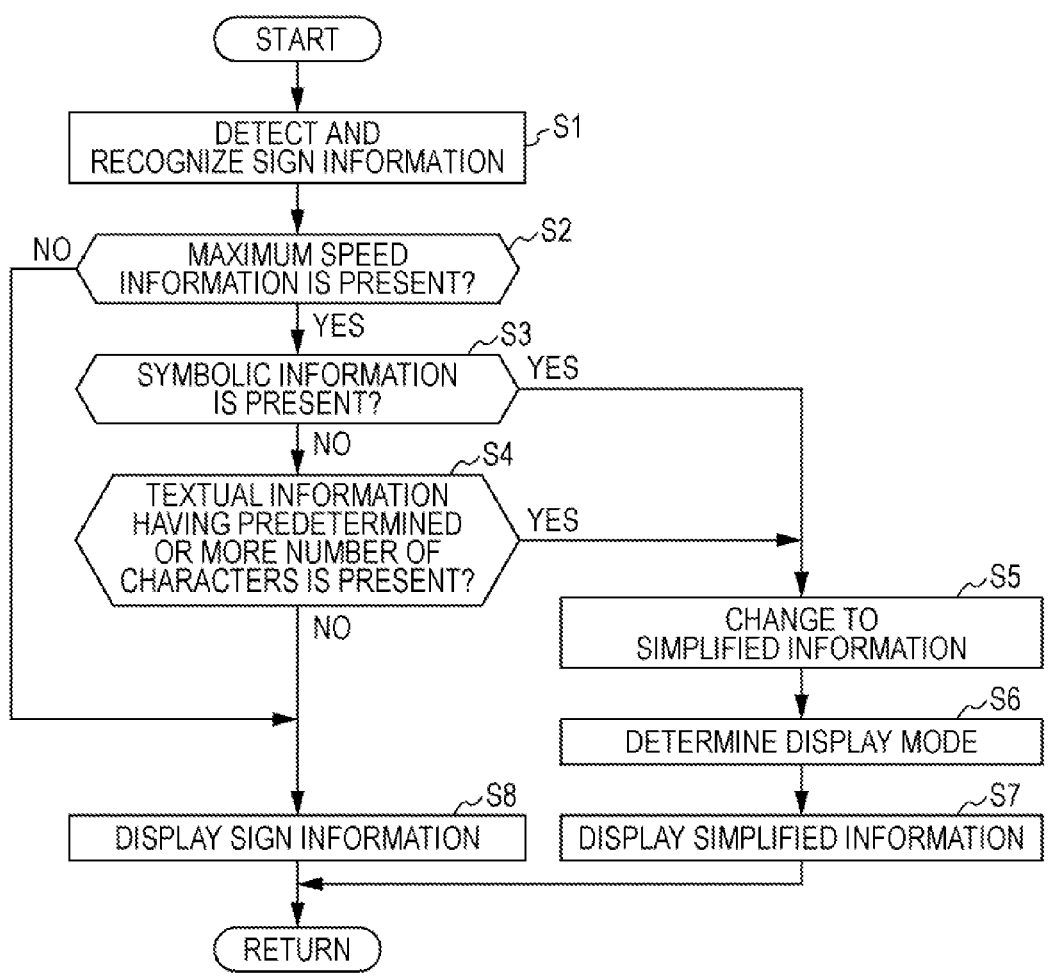
FIG. 3 is a flowchart of sign display processing 1.

As explained with reference to FIGS. 3 and 5A and 5B, when the maximum speed information and the textural information or the symbolic information other than the maximum speed information are contained in the sign information detected by the sign information detectors 16, 36, 44, and 48, the MID 28 displays, in addition to the maximum speed information, simplified information including simplified textural information or simplified symbolic information.

According to this embodiment, it is possible to appropriately display the maximum speed information and the textural information and the symbolic information other than the maximum speed information to the occupant in the limited indication region of the MID 28.

As shown in FIGS. 9A and 9B, the MID 28 includes the sign indication region 28a in which simplified information is displayed and the selective indication region 28b that has a display area larger than a display area of the sign indication region 28a and in which sign information and other images different from the sign information are selectively displayed. The MID 28 displays the simplified information in the sign indication region 28a and displays, in the selective indication region 28b, the sign information containing an information amount larger than an information amount of the simplified information when the display of the sign information in the selective indication region 28b is selected.

According to this embodiment, it is possible to adjust a detail level of the simplified information according to an indication region and it is possible to appropriately display necessary information to the occupant. That is, the selective indication region 28b has the display area larger than the display area of the sign indication region 28a. Therefore, in the selective indication region 28b, it is possible to display another version of the sign information with the content closer to an actual sign than the simplified information displayed in the sign indication region 28a. Consequently, the occupant can easily and intuitively recognize the display content.

As explained with reference to FIGS. 10A and 10B, the MID 28 hides the simplified information in the sign indication region 28a while the sign information is displayed in the selective indication region 28b. When a traveling distance of the vehicle 10 or an elapsed time after the sign information starts to be displayed in the selective indication region 28b becomes equal to or larger than a threshold, the MID 28 hides the sign information in the selective indication region 28b and displays the simplified information in the sign indication region 28a.

According to this embodiment, when the sign information is displayed in the selective indication region 28b, the occupant can easily recognize information. As the traveling distance of the vehicle 10 increases or time elapses, the indication region for displaying the sign information is shifted from the selective indication region 28b to the sign indication region 28a. Consequently, it is possible to enable the occupant to view the information when necessary while keeping the occupant from gazing the information more than necessary.

As explained with reference to FIG. 13, when two or more kinds of sign information having the overlapping effective sections are detected by the sign information detectors 16, 36, 44, and 48, the MID 28 alternately displays the simplified information 126 and the simplified information 128 while switching the simplified information 126 and 128 in predetermined time intervals, the simplified information 126 being the simplified information of at least one kind of the two or more kinds of sign information, the simplified information 128 being the simplified information of another kind of the two or more kinds of sign information.

When two or more kinds of sign information are displayed in a limited indication region, information that can be displayed is limited. According to this embodiment, it is possible to notify the two or more kinds of simplified information even if there is only one indication part.

The sign display apparatus for a vehicle 60 includes the plurality of types of sign information detectors 16, 36, 44, and 48. As explained with reference to FIGS. 7 and 8, the MID 28 displays the simplified information in a form that varies depending on the type of the sign information detector 16, 36, 44, and 48 that detects the sign information.

According to this embodiment, it is possible to inform the occupant which of the sign information detectors 16, 36, 44, and 48 detects the information displayed. Therefore, when the simplified information displayed on the MID 28 does not match the traffic sign actually installed on the traveling road 38, the occupant can recognize which of the sign information detectors 16, 36, 44, and 48 makes the mismatch. For example, the occupant can switch, using the selection switch 90, the sign information detectors 16, 36, 44, and 48 to be used. The occupant can recognize a failure.

As explained with reference to FIGS. 7 and 8, the MID 28 displays the passage information beside the simplified information such that the indication amount of the passage information changes with the increase in the traveling distance of the vehicle 10 or the elapsed time after the simplified information starts to be displayed. When the indication amount of the passage information exceeds the predetermined amount, it is also possible to hide the simplified information.

According to this embodiment, it is possible to easily recognize freshness of displayed sign information.

In the sign display method for a vehicle according to this embodiment, sign information on the traffic sign 40 or the road marking 42 ahead of the vehicle 10 is detected. When two or more kinds of sign information having overlapping effective sections are detected or when textural information including a predetermined or more number of characters is contained in the sign information, simplified information obtained by simplifying the sign information is displayed on the MID 28 in the vehicle 10.

According to this embodiment, even when two or more kinds of sign information or sign information including a predetermined or more number of characters is detected, it is possible to appropriately display content indicated by the sign information to the occupant in a limited indication region of the MID 28.

Note that, in this embodiment, the camera 36, the wireless receiver 44, the car navigation device 16, and the information terminal 48 are used as the sign information detector. However, one or more sign information detectors only have to be provided.

What is claimed is:

1. A sign display apparatus for a vehicle comprising:
   a sign information detector that detects sign information of a traffic sign existing on a road or on a road marking ahead of the vehicle;
   a display device that displays the sign information detected by the sign information detector;
   a control circuit configured to: (i) control the display device; (ii) detect an effective section of the detected traffic sign in which the traffic sign is considered to be effective; and (iii) determine whether or not the detected sign information contains textural information including a predetermined or more number of characters; and
   a memory which stores therein simplified textural information in association with the textural information of a corresponding traffic sign, the simplified textural information being composed of a reduced number of the characters representing the corresponding traffic sign, wherein
   when it is determined that the detected sign information contains the textural information including the predetermined or more number of characters, the display device is controlled to display the simplified textural information composed of the reduced number of the characters representing the corresponding traffic sign.

2. The sign display apparatus for the vehicle according to claim 1, wherein, when the sign information detected by the sign information detector contains maximum speed limit information and the textural information or symbolic information other than the maximum speed limit information, the display device is controlled to display the maximum speed limit information and additionally display the simplified information of the simplified textural information or symbolic information.

3. The sign display apparatus for the vehicle according to claim 1, wherein
   the control circuit is further configured to determine whether or not the sign information detector detects a plurality of traffic signs having effective sections which overlap each other, and
   when it is determined that the detected sign information contains the plurality of traffic signs having the overlapping effective sections, the display device is controlled to alternately display first simplified information of at least one traffic sign and second simplified information of a traffic sign other than said at least one traffic sign while switching the first and second simplified information in predetermined time intervals.

4. The sign display apparatus for the vehicle according to claim 1, wherein
   the sign display apparatus comprises a plurality of different sign information detectors, and
   the display device displays the simplified information in a form that varies depending on the sign information detector that detects the sign information.

5. The sign display apparatus for the vehicle according to claim 1, wherein
   the display device displays a passage information indicator beside the simplified information, the passage information indicator being configured to change in its amount to be displayed according to a traveling distance of the vehicle or an elapsed time after the simplified information is displayed, and
   when the amount of the passage information indicator exceeds a predetermined amount, the display device hides the simplified information.

6. A sign display apparatus for a vehicle, comprising:
   a sign information detector that detects sign information of a traffic sign existing on a road or on a road marking ahead of the vehicle;
   a display device that displays the sign information detected by the sign information detector;
   a control circuit configured to: (i) control the display device; (ii) detect an effective section of the detected traffic sign in which the traffic sign is considered to be effective; (iii) determine whether or not the sign information detector detects a plurality of traffic signs having effective sections which overlap each other; and (iv) determine whether or not the detected sign information contains textural information including a predetermined or more number of characters; and
   a memory which stores therein simplified information a corresponding traffic sign, wherein
   when it is determined that the sign information detector detects the plurality of traffic signs having the overlapping effective sections or when it is determined that the detected sign information contains the textural information including the predetermined or more number of characters, the display device is controlled to display the simplified information of at least one of the traffic signs or of the traffic sign containing the textural information,
   the display device has a sign display region in which the simplified information is displayed and a selective display region which has a display area larger than a display area of the sign display region and in which either of the sign information or information other than the sign information is selectively displayed, the display device displays the simplified information in the sign display region, and when the sign information is selected to be displayed in the selective display region, the display device displays in the selective display region the sign information which contains an information amount larger than an information amount of the simplified information.

7. The sign display apparatus for the vehicle according to claim 6, wherein the display device hides the simplified information in the sign display region while displaying the sign information in the selective display region, and when a traveling distance of the vehicle or an elapsed time becomes equal to or larger than a threshold after the sign information is displayed in the selective indication region, the display device hides the sign information in the selective display region and displays the simplified information in the sign display region.

8. A sign display method for a vehicle comprising:

detecting sign information of a traffic sign existing on a road or a road marking ahead of the vehicle;

detecting an effective section of the detected traffic sign in which the traffic sign is considered to be effective;

determining whether or not the detected sign information contains textural information including a predetermined number or more of characters;

providing simplified textural information of a corresponding traffic sign, the simplified textural information being composed of a reduced number of the characters representing the corresponding traffic sign; and when the detected sign information contains the textural information including the predetermined or more number of characters, displaying the simplified textural information composed of the reduced number of the characters representing the corresponding traffic sign on a display device of the vehicle.

* * * * *